United States Patent
Ryu et al.

(10) Patent No.: US 9,897,015 B2
(45) Date of Patent: Feb. 20, 2018

(54) SYSTEM AND METHOD FOR CONTROLLING VALVE TIMING OF CONTINUOUS VARIABLE VALVE DURATION ENGINE

(71) Applicant: HYUNDAI MOTOR COMPANY, Seoul (KR)

(72) Inventors: In Sang Ryu, Incheon (KR); Kyoung Pyo Ha, Seongnam-si (KR); You Sang Son, Suwon-si (KR); Kiyoung Kwon, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/340,692

(22) Filed: Nov. 1, 2016

(65) Prior Publication Data
US 2017/0167407 A1    Jun. 15, 2017

(30) Foreign Application Priority Data
Dec. 11, 2015    (KR) ........................ 10-2015-0176783

(51) Int. Cl.
*F02D 13/02*    (2006.01)
*F01L 1/40*    (2006.01)
(Continued)

(52) U.S. Cl.
CPC ............ *F02D 13/0215* (2013.01); *F01L 1/34* (2013.01); *F01L 1/40* (2013.01); *F02D 13/0234* (2013.01);
(Continued)

(58) Field of Classification Search
CPC ............. F02D 13/0215; F02D 13/0234; F02D 13/0238; F02D 13/0249; F02D 13/0261; F01L 1/40; F01L 2800/06; F01L 2800/10
(Continued)

(56) References Cited

U.S. PATENT DOCUMENTS

| | | | |
|---|---|---|---|
| 5,450,824 A | * | 9/1995 | Yamane ................ F02D 13/023 123/90.15 |
| 5,626,109 A | * | 5/1997 | Yasumura ................ F01L 1/34 123/90.15 |

(Continued)

FOREIGN PATENT DOCUMENTS

| | | |
|---|---|---|
| JP | 2006-118381 A | 5/2006 |
| JP | 2008-151059 A | 7/2008 |

(Continued)

*Primary Examiner* — Erick Solis
(74) *Attorney, Agent, or Firm* — Brinks Gilson & Lione (57) ABSTRACT

The present disclosure provides a system and a method for controlling valve timing of a continuous variable valve duration. The method may include: classifying a plurality of control regions depending on an engine speed and an engine speed; applying a maximum duration to an intake valve in a first control region; maintaining the maximum duration of the intake valve and controlling the exhaust valve to reach a maximum duration in a second control region; advancing intake valve closing (IVC) timing and exhaust valve closing (EVC) timing in a third control region; controlling the IVC timing to be close to bottom dead center (BDC) in a fourth control region; controlling a throttle valve to be fully opened and controlling the IVC timing to an angle after BDC in a fifth control region; and controlling the throttle valve to be fully opened and advancing the IVC timing in a sixth control region.

12 Claims, 10 Drawing Sheets

(51) Int. Cl.
*F01L 1/34* (2006.01)
*F02D 41/00* (2006.01)
*F02D 41/26* (2006.01)

(52) U.S. Cl.
CPC ..... *F02D 13/0238* (2013.01); *F02D 13/0249* (2013.01); *F02D 13/0261* (2013.01); *F02D 41/0007* (2013.01); *F02D 41/26* (2013.01); *F01L 2800/06* (2013.01); *F01L 2800/10* (2013.01); *F02D 2041/001* (2013.01); *F02D 2041/002* (2013.01); *F02D 2200/101* (2013.01)

(58) Field of Classification Search
USPC .......................... 123/90.15–90.18, 345–348
See application file for complete search history.

(56) References Cited

U.S. PATENT DOCUMENTS

| | | | |
|---|---|---|---|
| 6,390,040 B1* | 5/2002 | Hammoud | F01L 9/04 |
| | | | 123/406.29 |
| 8,561,394 B2* | 10/2013 | Porten | F01N 3/0842 |
| | | | 30/280 |
| 2002/0066436 A1* | 6/2002 | Majima | F01L 1/34 |
| | | | 123/406.47 |
| 2002/0134081 A1* | 9/2002 | Shiraishi | F01N 3/28 |
| | | | 60/602 |

FOREIGN PATENT DOCUMENTS

| | | |
|---|---|---|
| JP | 2008-274963 A | 11/2008 |
| JP | 2010-216464 A | 9/2010 |

* cited by examiner

SYSTEM AND METHOD FOR CONTROLLING VALVE TIMING OF CONTINUOUS VARIABLE VALVE DURATION ENGINE

CROSS-REFERENCE TO RELATED APPLICATION

This application claims priority to and the benefit of Korean Patent Application No. 10-2015-0176783, filed on Dec. 11, 2015, the entire contents of which are incorporated herein by reference.

FIELD

The present disclosure relates to a system and a method for controlling valve timing of a continuous variable valve duration engine.

BACKGROUND

The statements in this section merely provide background information related to the present disclosure and may not constitute prior art.

An internal combustion engine combusts mixed gas in which fuel and air are mixed at a predetermined ratio through a set ignition mode to generate power by using explosion pressure.

Generally, a camshaft is driven by a timing belt connected with a crankshaft that converts linear motion of a piston by the explosion pressure into rotating motion to actuate an intake valve and an exhaust valve, and while the intake valve is opened, air is suctioned into a combustion chamber, and while an exhaust valve is opened, gas which is combusted in the combustion chamber is exhausted.

In the operations of the intake valve and the exhaust valve, when a valve lift and a valve opening/closing time (timing) are controlled according to a rotational speed or load of an engine desired engine performance may be secured. Therefore, a continuous variable valve duration (CVVD) device controlling opening duration of an intake valve and an exhaust valve of the engine and a continuous variable valve timing (CVVT) device controlling opening timing and closing timing of the intake valve and the exhaust valve of the engine have been developed.

The CVVD device adjusts duration of the valve. In addition, the CVVT device advances or retards opening and closing timing of the valve in a state in which the duration of the valve is fixed. In other words, when the opening timing of the valve is determined, the closing timing is automatically determined according to the duration of the valve.

The above information disclosed in this Background section is only for enhancement of understanding of the background of the present disclosure and therefore it may contain information that does not form the prior art that is already known to a person of ordinary skill in the art.

Further areas of applicability will become apparent from the description provided herein. It should be understood that the description and specific examples are intended for purposes of illustration only and are not intended to limit the scope of the present disclosure.

SUMMARY

The present disclosure provides a system and a method for controlling valve timing of a continuous variable valve duration engine having advantages of controlling duration and timing according to an engine speed and an engine load by mounting continuous variable valve duration devices on an intake and an exhaust in a turbo engine.

A method for controlling valve timing of a turbo engine provided with continuous variable valve duration (CVVD) devices at an intake and an exhaust according to one form of the present disclosure may include: classifying a plurality of control regions depending on an engine speed and an engine load; applying a maximum duration to an intake valve in a first control region; maintaining the maximum duration of the intake valve and controlling the exhaust valve to reach a maximum duration in a second control region; advancing intake valve closing (IVC) timing and exhaust valve closing (EVC) timing in a third control region; controlling the IVC timing to be close to bottom dead center (BDC) in a fourth control region; controlling a throttle valve to be fully opened and controlling the IVC timing to an angle after BDC in a fifth control region; and controlling the throttle valve to be fully opened and advancing the IVC timing in a sixth control region.

The IVC timing may be fixed and the EVC timing may be set as a maximum value capable of maintaining combustion stability in the first control region.

The EVC timing may be retarded according to an increase in the engine load in the second control region.

The IVC timing may be advanced to be close to BDC when the engine speed is less than a predetermined speed and the IVC timing may be advanced to an angle after BDC when the engine speed is equal to or greater than the predetermined speed in the third control region.

The IVC timing may be controlled to be close to BDC and the EVC timing may be controlled to be close to top dead center (TDC) in the fourth control region.

The EVC timing may be controlled to be close to top dead center to reduce a valve overlap in the sixth control region.

A system for controlling valve timing of a continuous variable valve duration engine including a turbocharger according to one form of the present disclosure may include: a data detector detecting data related to a running state of a vehicle; a camshaft position sensor detecting a position of a camshaft; an intake continuous variable valve duration (CVVD) device controlling opening duration of an intake valve of the engine; an exhaust continuous variable valve duration (CVVD) device controlling opening duration of an exhaust valve of the engine; and a controller configured to classify a plurality of control regions depending on an engine speed and an engine load based on signals from the data detector and the camshaft position sensor, and configured to control the operations of the intake CVVD device and the exhaust CVVD device according to the control regions.

The controller applies a maximum duration to the intake valve in a first control region, maintains the maximum duration of the intake valve and controls the exhaust valve to reach a maximum duration in a second control region, advances intake valve closing (IVC) timing and exhaust valve closing (EVC) timing in a third control region, controls the IVC timing to be close to bottom dead center (BDC) in a fourth control region, controls a throttle valve to be fully opened and controls the IVC timing to an angle after BDC in a fifth control region, and controls the throttle valve to be fully opened and advances the IVC timing in a sixth control region.

The controller may fix the IVC timing and may set the EVC timing as a maximum value capable of maintaining combustion stability in the first control region.

The controller may retard the EVC timing according to an increase in the engine load in the second control region.

The controller may advance the IVC timing to be close to BDC when the engine speed is less than a predetermined speed and may advance the IVC timing to an angle after BDC when the engine speed is equal to or greater than the predetermined speed in the third control region.

The controller may control the IVC timing to be close to BDC and may control the EVC timing to be close to top dead center (TDC) in the fourth control region.

The controller may control the EVC timing to be close to top dead center to reduce a valve overlap in the sixth control region.

According to one form of the present disclosure, duration and timing of the continuous variable valve are controlled, so the engine may be controlled under desirable conditions.

Opening timing and closing timing of the intake valve and the exhaust valve are appropriately controlled, thereby improving fuel efficiency under a partial load condition and power performance under a high load condition. In addition, a fuel amount for starting may be reduced by increasing a valid compression ratio, and exhaust gas may be reduced by shortening time for heating a catalyst.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

Throughout this specification, and the claims which follow, unless explicitly described to the contrary, the word "comprise" and variations such as "comprises" or "comprising" will be understood to imply the inclusion of stated elements but not the exclusion of any other elements.

It is understood that the term "vehicle" or "vehicular" or other similar terms as used herein is inclusive of motor vehicles in general including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example a gasoline-powered and electric-powered vehicle.

Additionally, it is understood that some of the methods may be executed by at least one controller. The term controller refers to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller are network (CAN).

Figure 1:
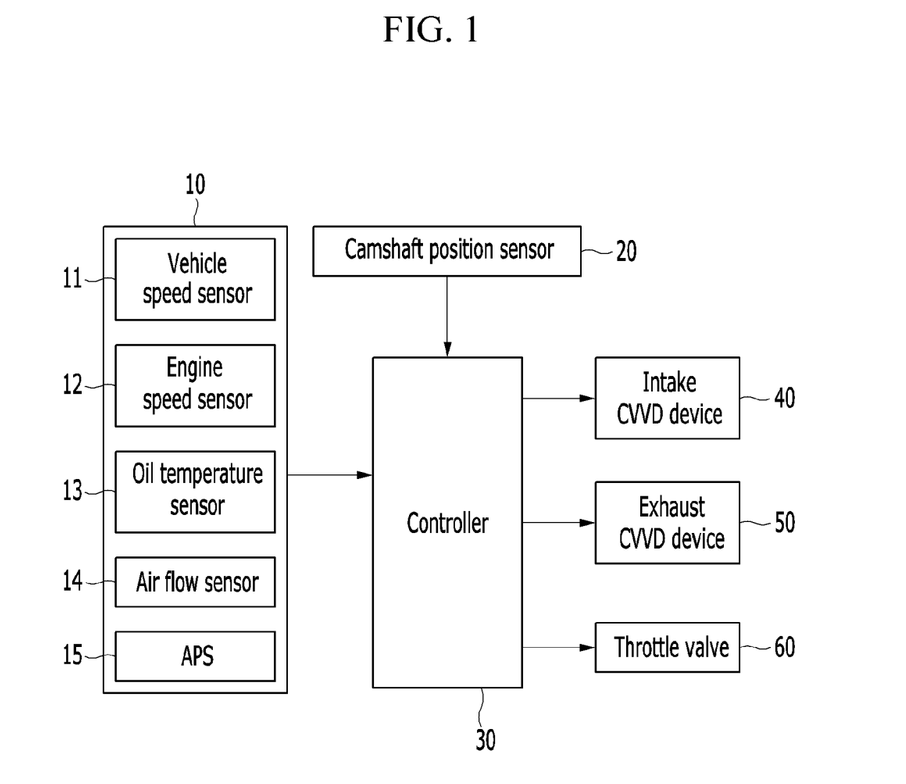
FIG. 1 is a schematic block diagram showing a system for controlling valve timing of a continuous variable valve duration engine according to one form of the present disclosure.

FIG. 1 is a schematic block diagram showing a system for controlling valve timing of a continuous variable valve duration engine according to one form of the present disclosure.

According to one form of the present disclosure, the engine as a power source of a vehicle is a turbo engine that includes a turbocharger. As shown in FIG. 1, a system for controlling valve timing of a continuous variable valve duration engine includes a data detector 10, a camshaft position sensor 20, a controller 30, an intake continuous variable valve duration (CVVD) device 40, an exhaust continuous variable valve duration device 50, and a throttle valve 60, although other sensors or systems may be employed to detect or determine the desired data.

The data detector 10 detects data related to a running state of the vehicle for controlling the CVVD devices, and includes a vehicle speed sensor 11, an engine speed sensor 12, an oil temperature sensor 13, an air flow sensor 14, and an accelerator pedal position sensor (APS) 15.

The vehicle speed sensor 11 detects a vehicle speed, and transmits a signal corresponding thereto to the controller 30. The vehicle speed sensor 11 may be mounted at a wheel of the vehicle.

The engine speed sensor 12 detects an engine speed from a change in phase of a crankshaft or camshaft, and transmits a signal corresponding thereto to the controller 30.

The oil temperature sensor (OTS) 13 detects temperature of oil flowing through an oil control valve (OCV), and transmits a signal corresponding thereto to the controller 30.

The oil temperature detected by the oil temperature sensor 13 may be determined by determining a coolant temperature using a coolant temperature sensor mounted at a coolant passage of an intake manifold. Therefore, in in one form, the oil temperature sensor 13 may include the coolant temperature sensor, and the oil temperature should be understood to be the coolant temperature.

The air flow sensor 14 detects an air amount flowing into the intake manifold, and transmits a signal corresponding thereto to the controller 30.

The accelerator pedal position sensor 15 detects a degree at which a driver pushes an accelerator pedal, and transmits a signal corresponding thereto to the controller 30. A position value of the accelerator pedal is approximately 100% when the accelerator pedal is pressed fully, and the position value of the accelerator pedal is approximately 0% when the accelerator pedal is not pressed at all.

A throttle valve position sensor that is mounted on an intake passage may be used instead of the accelerator pedal position sensor 15. Therefore, in one form, the accelerator pedal position sensor 15 may include the throttle valve position sensor, and the position value of the accelerator pedal should be understood to be opening value of the throttle valve.

The camshaft position sensor 20 detects a position of a camshaft angle, and transmits a signal corresponding thereto to the controller 30.

Figure 2:
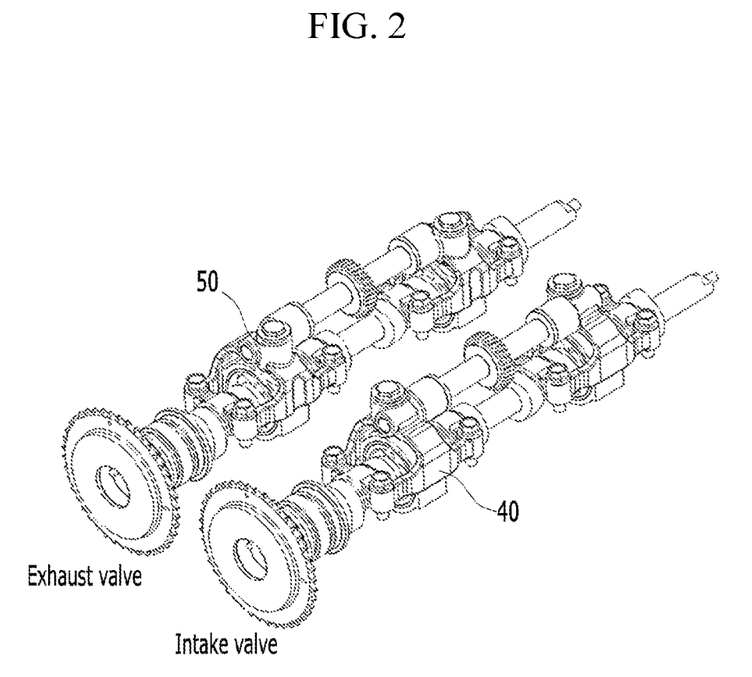
FIG. 2 is a perspective view showing an intake provided with a continuous variable valve duration device and an exhaust provided with a continuous variable valve duration device according to one form of the present disclosure.

FIG. 2 is a perspective view showing an intake provided with a continuous variable valve duration device and an exhaust provided with a continuous variable valve duration device according to one form of the present disclosure.

As shown in FIG. 2, continuous variable valve duration devices are mounted on the intake and the exhaust. Therefore, intake valve opening (IVO) timing and exhaust valve opening (EVO) timing are fixed. If the IVO timing is close to top dead center (TDC) under part load condition, fuel efficiency may be improved. Therefore, the IVO timing may be fixed at an angle of approximately 0-10 degrees before top dead center (TDC) and the EVO timing may be fixed at an angle of approximately 40-50 degrees before bottom dead center (BDC).

The intake continuous variable valve duration (CVVD) device 40 controls opening duration of an intake valve of the engine according to a signal from the controller 30, and the exhaust continuous variable valve duration (CVVD) device 50 controls opening duration of an exhaust valve of the engine according to a signal from the controller 30.

The throttle valve 60 adjusts the air amount flowing into the intake manifold.

The controller 30 classifies a plurality of control regions depending on an engine speed and an engine load based on signals of the data detector 10 and the camshaft position sensor 20, and the controller 30 controls operations of the intake CVVD device, the exhaust CVVD device 50 and the throttle valve 60. Herein, the plurality of control regions may be classified into six regions.

The controller 30 applies a maximum duration to the intake valve and controls a valve overlap by using exhaust valve closing (EVC) timing in a first control region, maintains maximum duration of the intake valve in a second control region, advances intake valve closing (IVC) timing and the EVC timing in a third control region, controls the IVC timing to be close to bottom dead center (BDC) in a fourth control region, controls the throttle valve to be fully opened and controls the IVC timing to an angle after BDC in a fifth control region, and controls the throttle valve to be fully opened and advances the IVC timing in a sixth control region.

For these purposes, the controller 30 may be implemented with at least one processor executed by a predetermined program, and the predetermined program may be programmed in order to perform each step of a method for controlling valve timing of a continuous variable valve duration engine according to one form of the present disclosure.

Various forms described herein may be implemented within a recording medium that may be read by a computer or similar device by using software, hardware, or a combination thereof, for example.

For example, the hardware of the forms described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electrical units designed to perform any other functions.

The software such as procedures and functions described in the forms of the present disclosure may be implemented by separate software modules. Each of the software modules may perform one or more functions and operations described in the present disclosure. A software code may be implemented by a software application written in an appropriate program language.

Hereinafter, a method for controlling valve timing of a continuous variable valve duration engine according to one form of the present disclosure will be described in detail with reference to FIG. 3A to FIG. 5C.

Figure 3A:
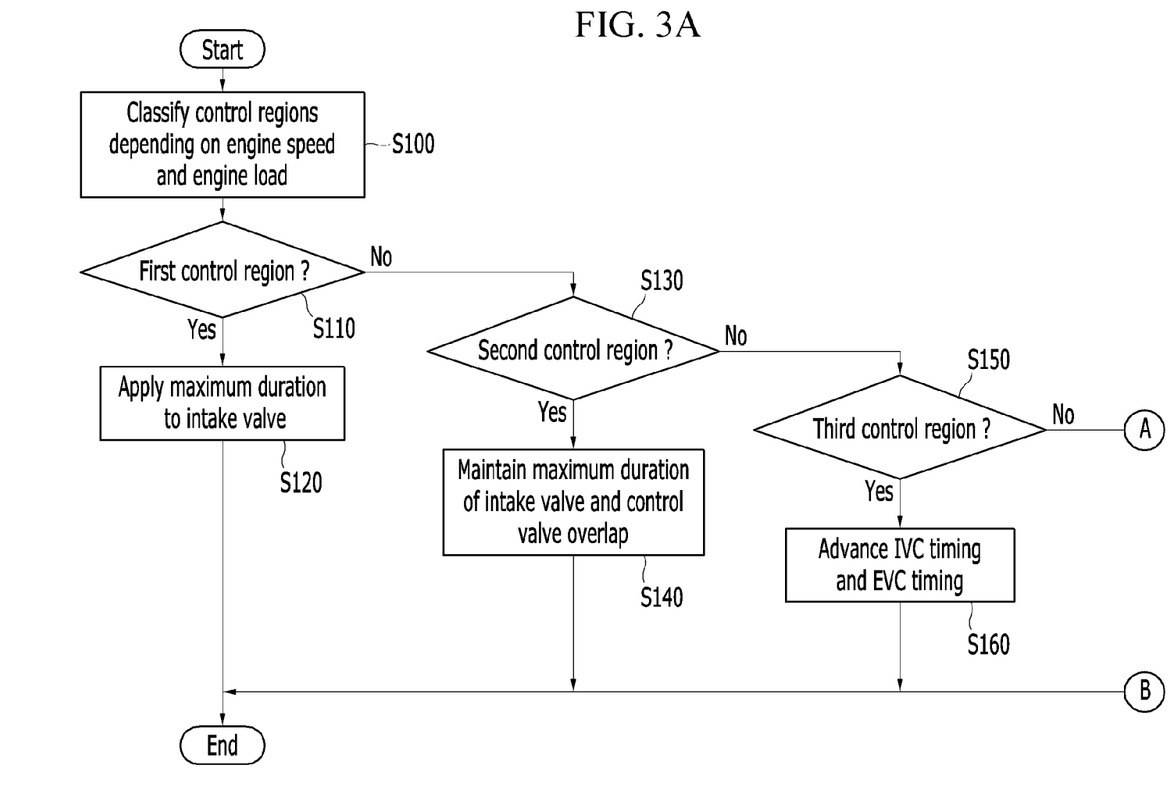
FIG. 3A and FIG. 3B are flowcharts showing a method for controlling valve timing of a continuous variable valve duration engine according to one form of the present disclosure.
Figure 3B:
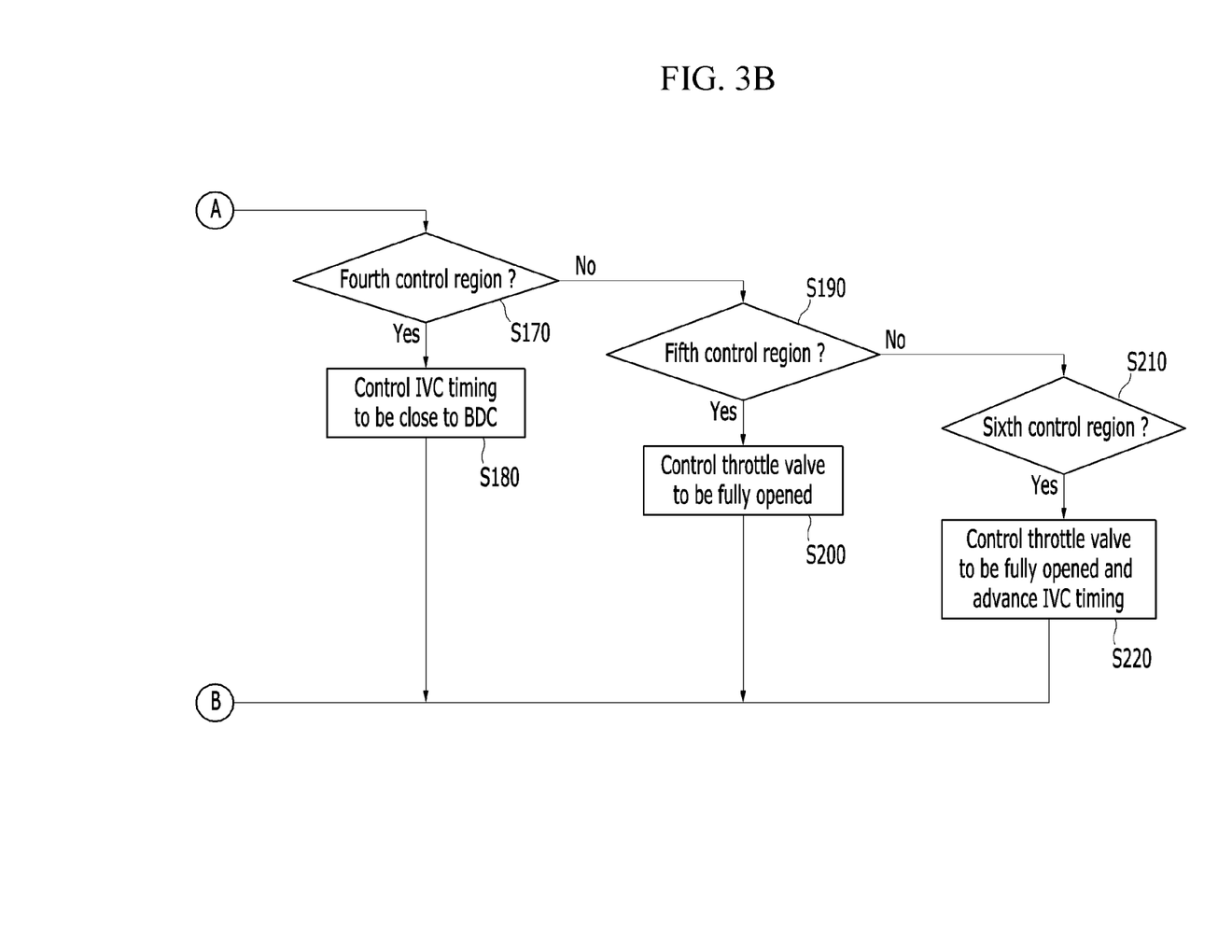
Figure 4A:
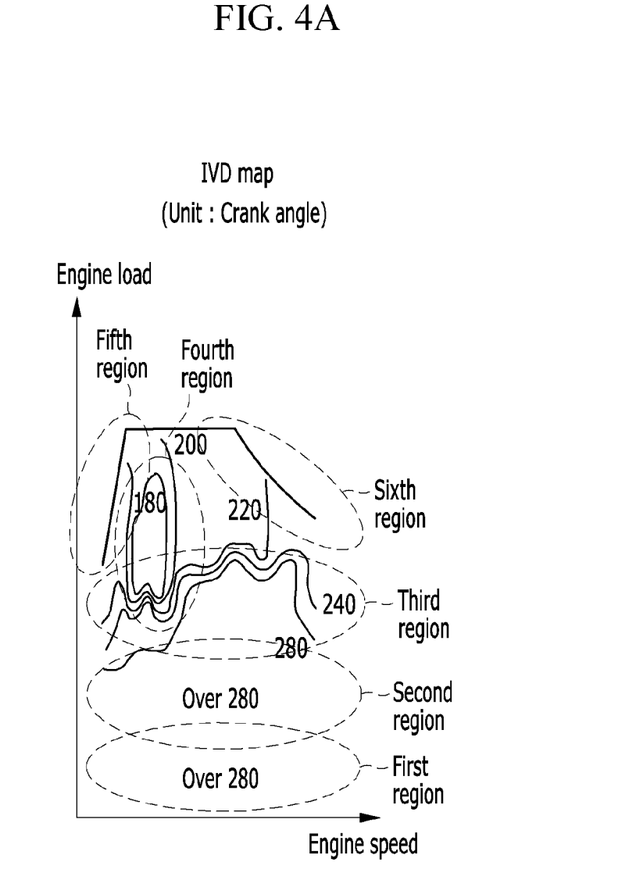
FIGS. 4A-4C are graphs showing duration, opening timing, and closing timing of an intake valve depending on an engine load and an engine speed according to the present disclosure.
Figure 4B:
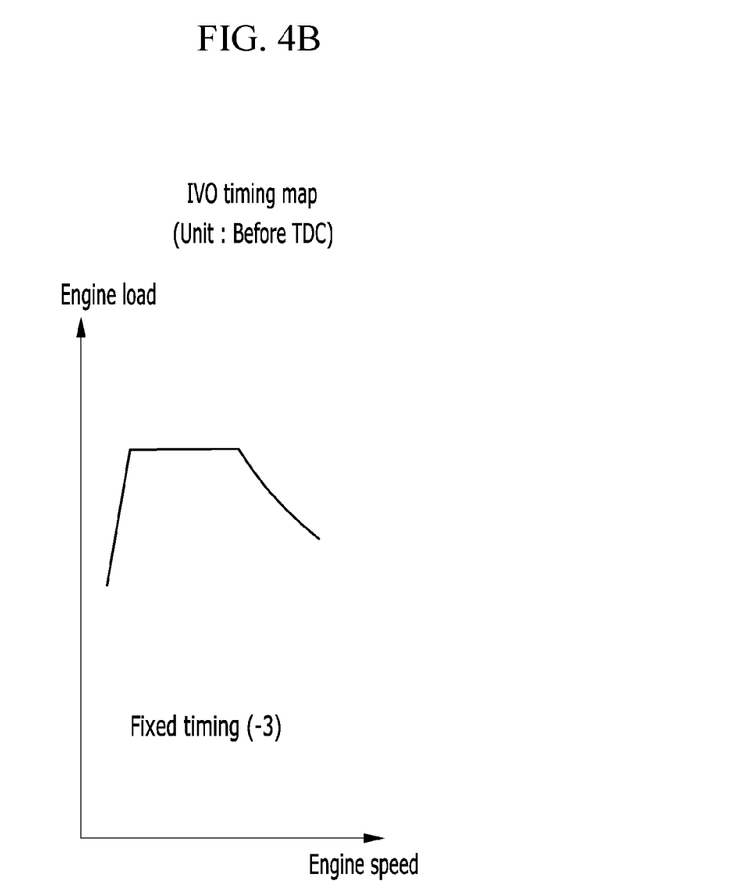
Figure 4C:
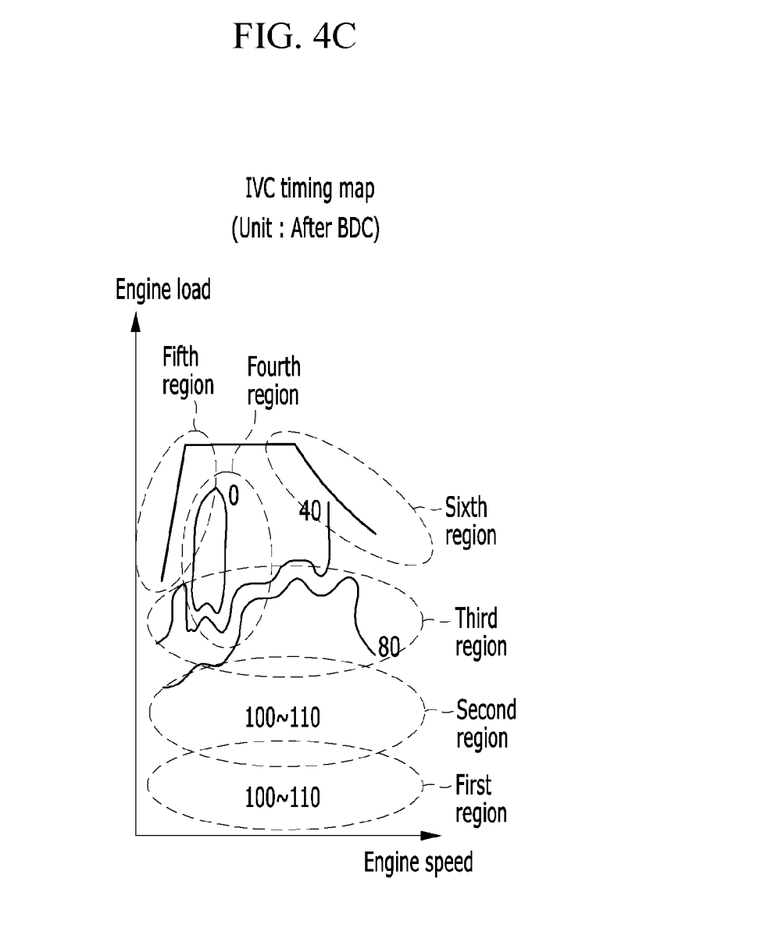
Figure 5A:
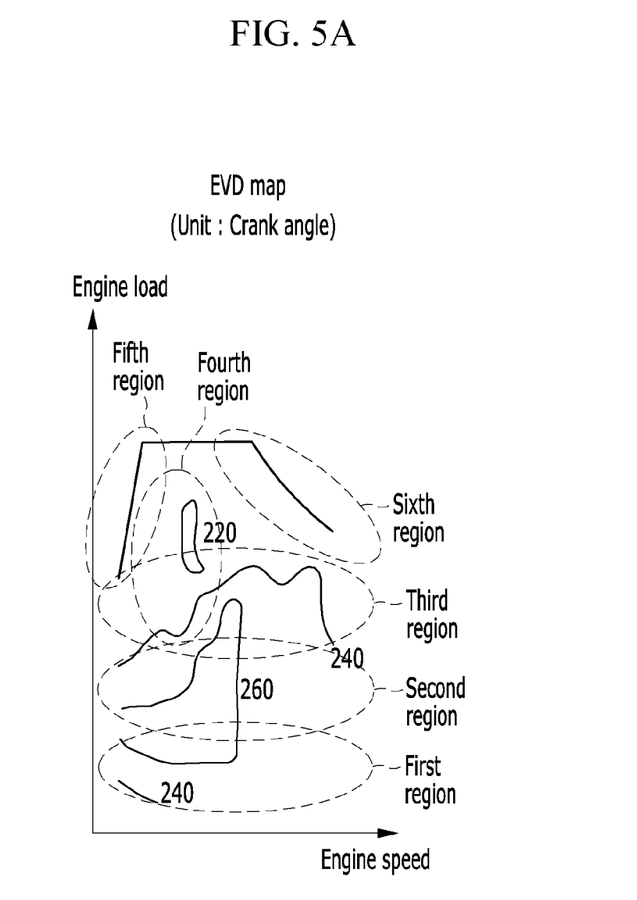
FIGS. 5A-5C are graphs showing duration, opening timing, and closing timing of an exhaust valve depending on an engine load and an engine speed according to the present disclosure.
Figure 5B:
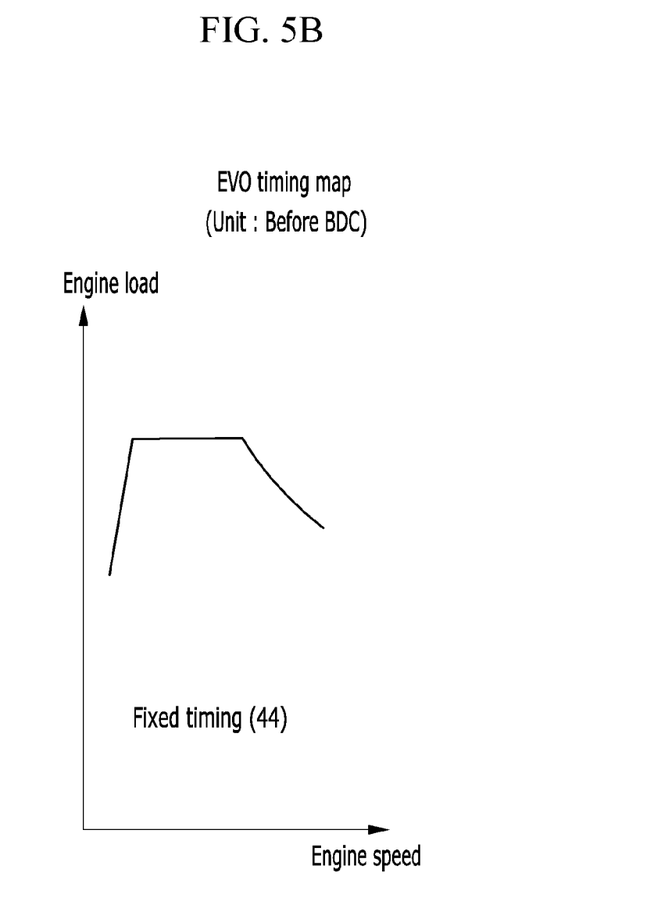
Figure 5C:
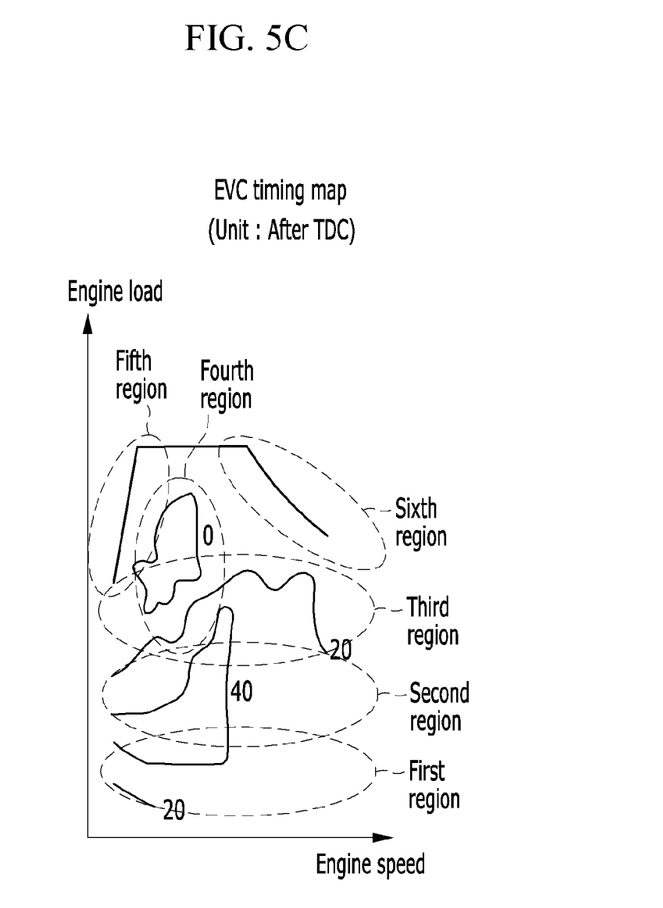

FIGS. 3A and 3B are flowcharts showing a method for controlling valve timing of a continuous variable valve duration engine. In addition, FIGS. 4A-4C are graphs showing duration, opening timing, and closing timing of an intake valve depending on an engine load and an engine speed, and FIGSA-5C. 5 are graphs showing duration, opening timing, and closing timing of an exhaust valve depending on an engine load and an engine speed.

As shown in FIGS. 3A and 3B, a method for controlling valve timing of a continuous variable valve duration engine begins with classifying a plurality of control regions depending on an engine load and an engine speed at step S100. The first to sixth control regions are indicated in the FIG. 4A to FIG. 5C.

The controller 30 may classify control regions as a first control region when the engine load is less than a first predetermined load, a second control region when the engine load is equal to or greater than the first predetermined load and less than a second predetermined load, and a third control region when the engine load is equal to or greater than the second predetermined load and less than a third predetermined load. In addition, the controller 30 may classify control regions as a fourth control region when the engine load is equal to or greater than the second predetermined load and the engine speed is equal to or greater than a first predetermined speed and less than a second predetermined speed, a fifth control region when the engine load is equal to or greater than the third predetermined load and the engine speed is less than the first predetermined speed, and sixth control region when the engine load is equal to or greater than the third predetermined load and the engine speed is equal to or greater than the second predetermined speed.

Meanwhile, as shown in FIG. 4A to FIG. 5C, a crank angle is indicated in an intake valve duration (IVD) map and an exhaust valve duration (EVD) map. For example, regarding the IVD map, a curved line indicated by "240" in the third control region means that the crank angel is approximately 240 degrees, and a curved line indicated by "280" means that the crank angle is approximately 280 degrees. Although not illustrated in FIGS. 4A-4C, a curved line having a crank angle between approximately 240 and 280 degrees may exist between the curved lines.

In addition, a number designated in an intake valve opening (IVO) timing map represents before top dead center (TDC), a number designated an intake valve closing (IVC) timing map represents after bottom dead center (BDC), a number designated in an exhaust valve opening (EVO) timing map represents before BDC, and a number designated in an exhaust valve closing (EVC) timing map represents after TDC.

Regions and curved lines shown in FIG. 4A to FIG. 5C are examples of one form of the present disclosure, and the scope of the present disclosure is not limited thereto.

When the control regions are classified depending on the engine load and the engine speed at step S100, the controller 30 determines whether a current engine state belongs to the first control region at step S110.

When the engine load is less than the first predetermined load at step S110, the controller 30 determines that the current engine state belongs to the first control region. In this case, the controller 30 applies the maximum duration to the intake valve and controls the valve overlap between the exhaust valve and the intake valve at step S120. The valve overlap represents a state in which the intake valve is opened and the exhaust valve is not closed yet.

In other words, when the engine is operated at a low load condition, the controller 30 may fix the IVC timing to apply the maximum duration to the intake valve. Since the IVO timing is fixed in the exemplary form of the present disclosure, the IVC timing may be fixed at an angle of approximately 100-110 degrees after BDC.

In addition, the controller 30 may set the EVC timing as a maximum value capable of maintaining combustion stability. As the valve overlap is increased, fuel efficiency may be improved, but combustion stability may be deteriorated. Accordingly, properly setting the valve overlap is desired. By fixing the IVC timing and by setting the EVC timing as the maximum value capable of maintaining combustion stability, a valve overlap may be realized, and thus fuel efficiency may be improved. Since the EVO timing is fixed in one form of the present disclosure, as the EVC timing is retarded, exhaust duration is gradually increased.

When the current engine state does not belong to the first control region at step S110, the controller 30 determines whether the current engine state belongs to the second control region at step S130.

When the engine load is equal to or greater than the first predetermined load and is less than the second predetermined load at step S130, the controller 30 determines that the current engine state belongs to the second control region. In this case, the controller 30 maintains the maximum duration of the intake valve and controls the exhaust valve to reach a maximum duration at step S140.

The controller 30 retards the EVC timing according to an increase in an engine load such that the exhaust valve reaches the maximum duration. Accordingly, the maximum duration of the intake valve being used in the first control region and the maximum duration of the exhaust valve may be used in the second control region.

When the current engine state does not belong to the second control region at step S130, the controller 30 determines whether the current engine state belongs to the third control region at step S150.

When the current engine state belongs to the third control region at step S150, the controller 30 advances the IVC timing and the EVC timing at step S160.

As described above, the IVC timing is controlled to be at a late intake valve close (LIVC) position (at the angle of approximately 100-110 degrees after BDC) in the first control region and the second control region. When the IVC timing is positioned at the LIVC position, as the engine load is increased, boost pressure may be increased, knocking may occur, and fuel efficiency may be deteriorated. In order to prevent or inhibit the aforementioned phenomenon, the controller 30 advances the IVC timing in the third control region where the engine load is relatively large.

In this case, so as to reflect characteristics of the turbo engine, the controller 30 may rapidly advance the IVC timing to be close to BDC when the engine speed is less than a predetermined speed, and may slowly advance the IVC timing to an angle of approximately 30-50 degrees after BDC when the engine speed is equal to or greater than the predetermined speed. For example, the predetermined speed may be approximately 1500 rpm.

In addition, since the EVC timing is positioned at maximum valve overlap in the second control region, the controller 30 may advance the EVC timing to be close to TDC.

When the current engine state does not belong to the third control region at step S150, the controller 30 determines whether the current engine state belongs to the fourth control region at step S170.

When the controller 30 determines that the current engine state belongs to the fourth control region at step S170, the controller 30 controls the IVC timing to be close to BDC at step S180.

The fourth control region may be a low boost region at which the engine load is equal to or greater than the second predetermined load and the engine speed is equal to or greater than the first predetermined speed and less than the second predetermined speed. For example, the first predetermined speed may be approximately 1500 rpm, and the second predetermined speed may be approximately 2500 rpm.

The controller 30 controls the IVC timing to be close to BDC, thereby improving fuel efficiency. In addition, the valve overlap may be reduced by controlling the EVC timing to be close to TDC. Accordingly, short intake duration (e.g., approximately 180 degrees) may be used in the fourth control region.

When the current engine state does not belong to the fourth control region at step S170, the controller 30 determines whether the current engine state belongs to the fifth control region at step S190.

When the engine load is equal to or greater than the third predetermined load and the engine speed is less than the first predetermined speed at step S190, the controller 30 determines that the current engine state belongs to the fifth control region. In this case, the controller 30 controls the throttle valve 60 to be fully opened and controls the IVC timing to an angle after BDC at step S200.

In the turbo engine, when the throttle valve is fully opened (i.e., WOT; Wide Open Throttle) in the fifth control region at which the engine speed is less than the first predetermined speed (e.g., 1500 rpm), intake port pressure becomes higher than the exhaust port pressure. Therefore, a scavenging phenomenon occurs easily compared to a natural aspirated engine. In one form of the present disclosure, however, since the IVO timing is fixed, even though the IVC timing is controlled in an after BDC direction, the scavenging phenomenon hardly occurs.

When the current engine state does not belong to the fifth control region at step S190, the controller 30 determines whether the current engine state belongs to the sixth control region at step S210.

When the engine load is equal to or greater than the third predetermined load and the engine speed is equal to or greater than the second predetermined speed, the controller 30 determines that the current engine state belongs to the sixth control region. In this case, the controller 30 controls the throttle valve 60 to be fully opened and advances the IVC timing at step S220.

When the engine speed is equal to or greater than the second predetermined speed (e.g., approximately 2500 rpm), since the exhaust port pressure is significantly greater than the intake port pressure, the scavenging phenomenon disappears or is reduced. In this case, since the EVO timing is fixed to be advantageous to exhaust pumping, the valve overlap may be reduced by controlling the EVC timing to be close to TDC.

Meanwhile, when WOT control is performed at a high speed condition, the knocking hardly occurs in the natural aspirated engine, but on the contrary, the knocking easily occurs in the turbo engine. Accordingly, the controller 30 advances the IVC timing within an angle range of approximately 50 degrees after BDC to reduce boost pressure such that the knocking is prevented or reduced.

As described above, according to one form of the present disclosure, duration and timing of the continuous variable valve are controlled, so the engine may be controlled under desirable conditions.

Opening timing and closing timing of the intake valve and the exhaust valve are appropriately controlled, thereby improving fuel efficiency under a partial load condition and power performance under a high load condition. In addition, a fuel amount for starting may be reduced by increasing a valid compression ratio, and exhaust gas may be reduced by shortening time for heating a catalyst.

While this disclosure has been described in connection with what is presently considered to be practical forms, it is to be understood that the present disclosure is not limited to the disclosed forms, but, on the contrary, is intended to cover various modifications and equivalent arrangements included within the spirit and scope of the appended claims.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for controlling valve timing of a turbo engine provided with continuous variable valve duration (CVVD) devices at an intake and an exhaust, the method comprising:
    classifying, by a controller, a plurality of control regions depending on an engine speed and an engine load;
    applying, by the controller, a maximum duration to an intake valve in a first control region;
    maintaining, by the controller, the maximum duration of the intake valve and controlling, by the controller, the exhaust valve to reach a maximum duration in a second control region;
    advancing, by the controller, an intake valve closing (IVC) timing and an exhaust valve closing (EVC) timing in a third control region;
    controlling, by the controller, the IVC timing to be close to a bottom dead center (BDC) in a fourth control region;
    controlling, by the controller, a throttle valve to be fully opened and controlling the IVC timing to an angle after the BDC in a fifth control region; and
    controlling, by the controller, the throttle valve to be fully opened and advancing the IVC timing in a sixth control region.

2. The method of claim 1, wherein the IVC timing is fixed and the EVC timing is set as a maximum value capable of maintaining combustion stability in the first control region.

3. The method of claim 1, wherein the EVC timing is retarded according to an increase in the engine load in the second control region.

4. The method of claim 1, wherein the IVC timing is advanced to be close to the BDC when the engine speed is less than a predetermined speed and the IVC timing is advanced to an angle after the BDC when the engine speed is equal to or greater than the predetermined speed in the third control region.

5. The method of claim 1, wherein the IVC timing is controlled to be close to the BDC and the EVC timing is controlled to be close to a top dead center (TDC) in the fourth control region.

6. The method of claim 1, wherein the EVC timing is controlled to be close to a top dead center to reduce a valve overlap in the sixth control region.

7. A system for controlling valve timing of a continuous variable valve duration engine including a turbocharger, the system comprising:
    a data detector configured to detect data related to a running state of a vehicle;
    a camshaft position sensor configured to detect a position of a camshaft;
    an intake continuous variable valve duration (CVVD) device configured to control opening duration of an intake valve of the engine;
    an exhaust continuous variable valve duration (CVVD) device configured to control opening duration of an exhaust valve of the engine; and
    a controller configured to classify a plurality of control regions depending on an engine speed and an engine load based on signals from the data detector and the camshaft position sensor, and configured to control operations of the intake CVVD device and the exhaust CVVD device according to the control regions,
    wherein the controller applies a maximum duration to the intake valve in a first control region, maintains the maximum duration of the intake valve and controls the exhaust valve to reach a maximum duration in a second control region, advances intake valve closing (IVC) timing and exhaust valve closing (EVC) timing in a third control region, controls the IVC timing to be close to a bottom dead center (BDC) in a fourth control region, controls a throttle valve to be fully opened and controls the IVC timing to an angle after the BDC in a fifth control region, and controls the throttle valve to be fully opened and advances the IVC timing in a sixth control region.

8. The system of claim 7, wherein the controller fixes the IVC timing and sets the EVC timing as a maximum value capable of maintaining combustion stability in the first control region.

9. The system of claim 7, wherein the controller retards the EVC timing according to an increase in the engine load in the second control region.

10. The system of claim 7, wherein the controller advances the IVC timing to be close to the BDC when the engine speed is less than a predetermined speed and advances the IVC timing to an angle after the BDC when the engine speed is equal to or greater than the predetermined speed in the third control region.

11. The method of claim 7, wherein the controller controls the IVC timing to be close to the BDC and controls the EVC timing to be close to a top dead center (TDC) in the fourth control region.

12. The method of claim 7, wherein the controller controls the EVC timing to be close to a top dead center to reduce a valve overlap in the sixth control region.

* * * * *